UNITED STATES PATENT OFFICE.

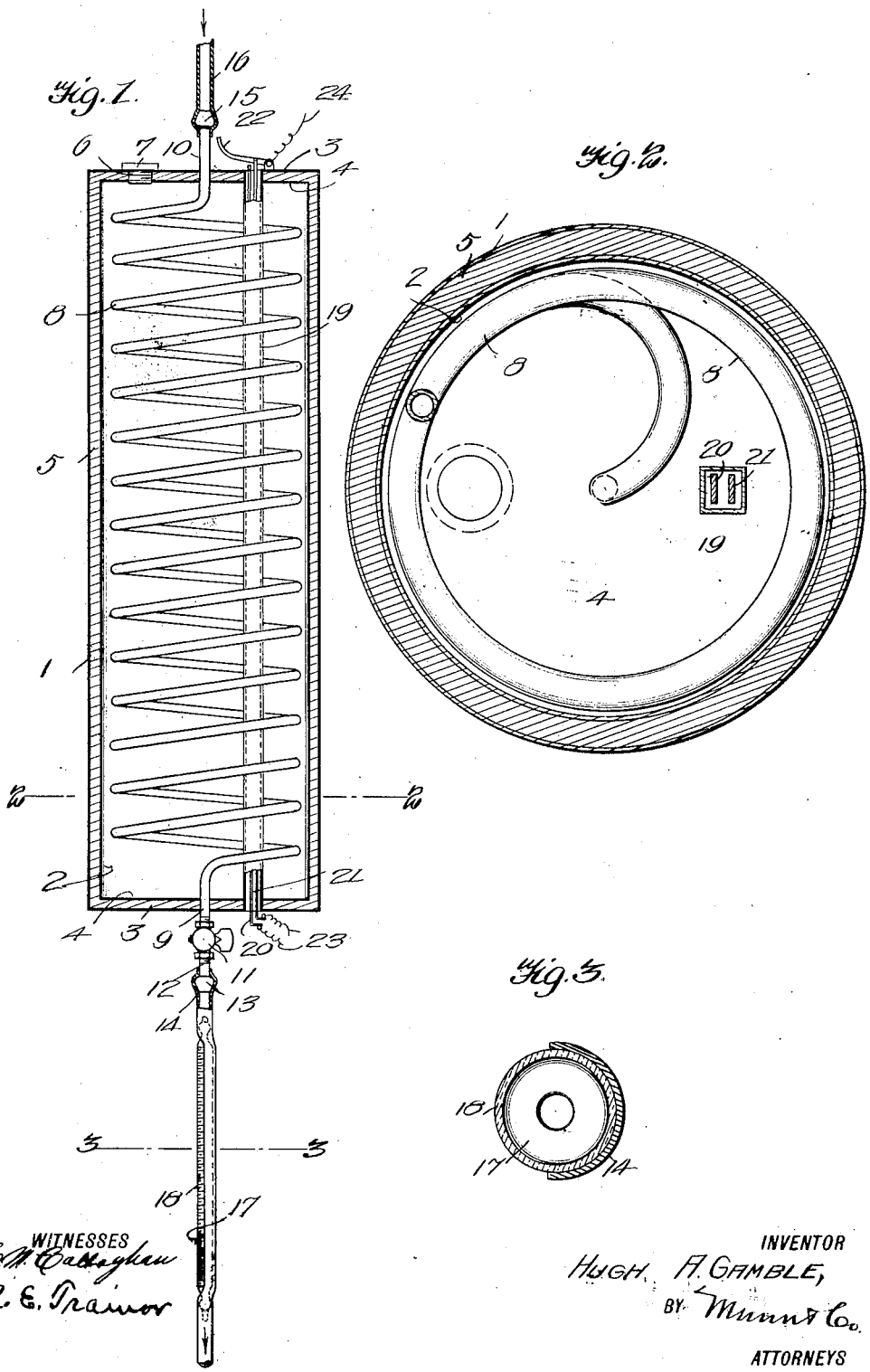

HUGH A. GAMBLE, OF GREENVILLE, MISSISSIPPI.

ELECTRIC HEATER.

1,110,919.

Specification of Letters Patent.

Patented Sept. 15, 1914.

Application filed February 20, 1913. Serial No. 749,627.

*To all whom it may concern:*

Be it known that I, HUGH A. GAMBLE, a citizen of the United States, and a resident of Greenville, in the county of Washington and State of Mississippi, have invented a new and useful Improvement in Electric Heaters, of which the following is a specification.

My invention is an improvement in electric heaters for drop enema, and has for its object the provision of a simple, inexpensive and easily operated heater of the character specified, for maintaining a uniform temperature in the solution during its administration.

In the drawings:—Figure 1 is a longitudinal section of the heater, and Figs. 2 and 3 are enlarged sections on the lines 2—2 and 3—3 respectively of Fig. 1.

The present embodiment of the invention consists of a receptacle composed of outer and inner casings 1 and 2 of cylindrical or oval form, each having closed ends 3 and 4 respectively, and the said casings are arranged in spaced relation, and a filling 5 of asbestos or other non-heat conducting material is arranged between the said casings.

An opening 6 is arranged at the upper end of the receptacle, and the said opening is normally closed by a threaded plug 7, the said plug forming a fluid tight closure for the opening. A coil 8 of tubing of suitable cross section is arranged within the receptacle, and the ends 9 and 10 of the coil are passed out through the ends of the receptacle at approximately the center of the said ends.

A valve casing 11 is connected with the end 9 of the coil, and an extension pipe 12 is arranged beyond the casing, the said extension pipe having an enlargement 13 over which is adapted to be slipped one end of a rubber tube 14. The end 10 of the coil is also provided with an enlargement 15, and the one end of a rubber tube 16 is slipped over the said enlargement, the enlargements 13 and 15 being designed to prevent displacement of the tubes 14 and 16 respectively.

A thermometer 17 is arranged within the rubber tube 14 just beyond the enlargement in such manner that the graduations 18 thereof are exposed to view, the said thermometer being so placed to register the heat of the solution passing through the tube.

The ends of the receptacle are provided with registering openings, and a tubular structure 19 is arranged within the receptacle, the ends of the tubular structure engaging the respective openings at the ends of the receptacle. The tubular structure 19 is rectangular in cross section as shown in Fig. 2, and an electric heater is arranged within the said tubular structure.

The bars 20 and 21 of the heater extend beyond the tubular structure 19 at each end thereof, and a switch 22 of any desired construction is arranged at the upper end of the receptacle for connecting or disconnecting the heater and any desired source of electrical energy.

Leads 23 and 24 are provided for connecting the said heater with the source of supply, and the receptacle is designed to be filled with hot water or other suitable liquid, which is maintained at the proper temperature by the electric heater.

In operation, the solution is passed through the coil, by connecting the receptacle containing the same with the coil by means of the tube 16. The valve 11 is closed and the heater is then connected with the source of electrical energy, and so left until the water has attained a suitable temperature.

The valve 11 may be then opened to permit the passage of the solution. It will be obvious that a suitable rheostat of ordinary form and therefore not shown, may be interposed in the circuit of the heater, to retain the liquid in the receptacle at the desired temperature. As soon as the temperature reaches the proper point, this fact will be indicated by the thermometer and the solution is then ready for use.

I claim:—

1. In a heater of the character specified, a receptacle for liquid comprising inner and outer casings arranged in spaced relation, and a filling of non-heat conducting material between the casings, the receptacle having a filling opening and being designed to receive a heating coil, and a tubular structure extending from one end of the receptacle to the other and opening at the ends of the receptacle for receiving an electrical heating device.

2. In a heater of the character specified, a spiral coil having a general cylindrical form, the ends of the coil being in the axis of the cylindrical figure described by the coils, a nipple at each end of the coil for engagement by flexible conducting pipes, a valve interposed between one of the nipples and the adjacent end of the coil, and a flexible pipe engaging the nipple at the end adjacent to the valve casing and provided with a thermometer for indicating the temperature of the liquid flowing therefrom.

HUGH A. GAMBLE.

Witnesses:
 STEVE A. FINLAY,
 MAURICE A. BERGMAN.